United States Patent [19]

Kim

[11] 4,133,869

[45] Jan. 9, 1979

[54] HYDROGEN PEROXIDE STABILIZATION

[75] Inventor: Leo Kim, Houston, Tex.

[73] Assignee: Shell Oil Company, Houston, Tex.

[21] Appl. No.: 847,273

[22] Filed: Oct. 31, 1977

[51] Int. Cl.$^2$ .............................................. G01B 15/02
[52] U.S. Cl. ..................................... 423/272; 423/584
[58] Field of Search ................................ 423/272, 584

[56] References Cited

U.S. PATENT DOCUMENTS 4,007,256  2/1977  Kim et al. ............................. 423/584

Primary Examiner—O. R. Vertiz
Assistant Examiner—Wayne A. Langel

[57] ABSTRACT

Aqueous hydrogen peroxide solutions are stabilized against decomposition due to transition metal impurities by adding at least about 0.001 milliliters of acetonitrile per milliliter of total solution.

4 Claims, No Drawings

HYDROGEN PEROXIDE STABILIZATION

BACKGROUND OF THE INVENTION

1. Field of the Invention

This invention relates to a method of stabilizing hydrogen peroxide solution using acetonitrile.

2. Description of the Prior Art

It has long been known that small concentrations of transition metal ions such as those of iron, copper, nickel, lead, chromium or manganese in a hydrogen peroxide solution cause the hydrogen peroxide to decompose. This can be quite troublesome in the manufacture and storage of hydrogen peroxide. The materials of construction used in commercial hydrogen peroxide units make it virtually impossible to exclude all traces of transition metal ions from the process streams and the product hydrogen peroxide solutions. Methods of slowing down or stopping the decomposition of hydrogen peroxide in the presence of transition metal ions would be quite useful industrially.

Several organic materials have been added to hydrogen peroxide solutions to stabilize them. U.S. Pat. No. 3,053,633, issued Sept. 11, 1962, to Dunlop et al. disclosed the use of phytic acid in the presence of pyridine carboxylic acids. U.S. Pat. No. 3,053,632 issued Sept. 11, 1962, to Meeker disclosed the use of hydroxyquinolines. U.S. Pat. No. 3,801,512 issued Apr. 2, 1974, to Solenberger disclosed the use of anilines and other organics. U.S. Pat. No. 3,903,244 issued Sept. 2, 1975, to Winkler disclosed the use of amino (methyl phosphonic acid). None of the prior art references disclose the use of acetonitrile as a stabilizer.

SUMMARY OF THE INVENTION

This invention provides a method for stabilizing hydrogen peroxide solution against decomposition caused by transition metal ions. Stabilized hydrogen peroxide solutions will show significantly less decomposition of the hydrogen peroxide for a given period of time than will unstabilized solutions. The method of this invention utilizes at least about 0.001 milliliters of acetonitrile per milliliter of total stabilized solution as a stabilizing agent.

DESCRIPTION OF THE PREFERRED EMBODIMENTS

The hydrogen peroxide solutions stabilized by the method of this invention will contain less than about 30% hydrogen peroxide. The use of solutions having concentrations greater than 30% can lead to explosive mixtures.

The acetonitrile to be added to the hydrogen peroxide solution may be used neat or admixed with water. The amount of acetonitrile required will be greater than about 0.001 and preferably greater than about 0.01 milliliters of acetonitrile per milliliter of total solution. The maximum amount of acetonitrile used is determined by economic considerations, i.e., large amounts of acetonitrile is operative but the cost-effectiveness ratio becomes prohibitively large with amounts of acetonitrile. The preferred amount of acetonitrile utilized ranges from about 0.001 to about 1 and more preferably from about 0.01 to about 0.1 milliliters of acetonitrile per milliliter of total solution.

This invention is also directed to compositions of stabilized aqueous solutions of hydrogen peroxide. These will contain less than 30 percent by volume of hydrogen peroxide, more than 0.1 and preferably more than 1 percent by volume of acetonitrile with the balance of the composition being water.

The method of this invention is quite useful in commercial processes for the production of hydrogen peroxide. The acetonitrile can be injected into the dilute (less than 30% hydrogen peroxide) process streams to minimize decomposition and later removed (by suitable means, e.g., distillation and/or flashing. The acetonitrile can then be recycled.) prior to the concentration of hydrogen peroxide.

This invention will be further described by the following illustrative embodiments which are provided for illustration and are not to be construed as limiting the invention.

ILLUSTRATIVE EMBODIMENTS

Example I

Into a 50 ml flask was placed 10 ml of 20% hydrogen peroxide and 1 ml of a solution made from 0.15g $FeSO_4$ in 100 ml water. Cerric sulfate titration indicated that just after the addition of the iron solution 17.27% $H_2O_2$ was present. After 10 minutes at room temperature 15.22% $H_2O_2$ was present (88.1% of original amount). After 60 minutes at room temperature 4.98% $H_2O_2$ was found (28.8% of original amount).

EXAMPLE 2

Example I was repeated adding 0.5 ml acetonitrile. From an initial 16.28% $H_2O_2$ solution, 13.86% $H_2O_2$ was detected after 60 minutes (85.1% of original amount).

EXAMPLE 3

Example 3 was repeated except that 1 ml acetonitrile was used. An initial 26.86% $H_2O_2$ solution dropped to 23.59% $H_2O_2$ in 60 minutes (87.8% of original amount).

EXAMPLE 4

Example I was repeated using 0.15g $Cu(No_3)_2$ in place of $FeSO_4$. Initial $H_2O_2$ concentration was 18.75%. After 60 minutes the $H_2O_2$ concentration was found to be 14.81% (79.0% of original amount).

EXAMPLE 5

Example 4 was repeated adding 0.5 ml acetonitrile. Initial $H_2O_2$ concentration was 19.83%. After 60 minutes 18.98% was found (95.7% of original amount).

What is claimed is:

1. A method of stabilizing an aqueous hydrogen peroxide solution against decomposition caused by transition metals, said solution having up to about thirty percent by weight of hydrogen peroxide, which comprises adding to the solution more than about 0.001 milliliters of acetonitrile per milliliter of total solution.

2. The method of claim 1 wherein the acetonitrile is more than about 0.01 milliliters of acetonitrile per milliliter of total solution.

3. A composition comprising an aqueous hydrogen peroxide solution containing up to about thirty percent by weight of hydrogen peroxide and more than 0.001 milliliters of acetonitrile per milliliter of total solution.

4. The composition of claim 3 wherein said acetonitrile is more than about 0.01 milliliters per milliliter of total solution.

* * * * *